G. A. BILLOW.
WEEDER.
APPLICATION FILED MAY 25, 1912.
1,053,148.
Patented Feb. 18, 1913.
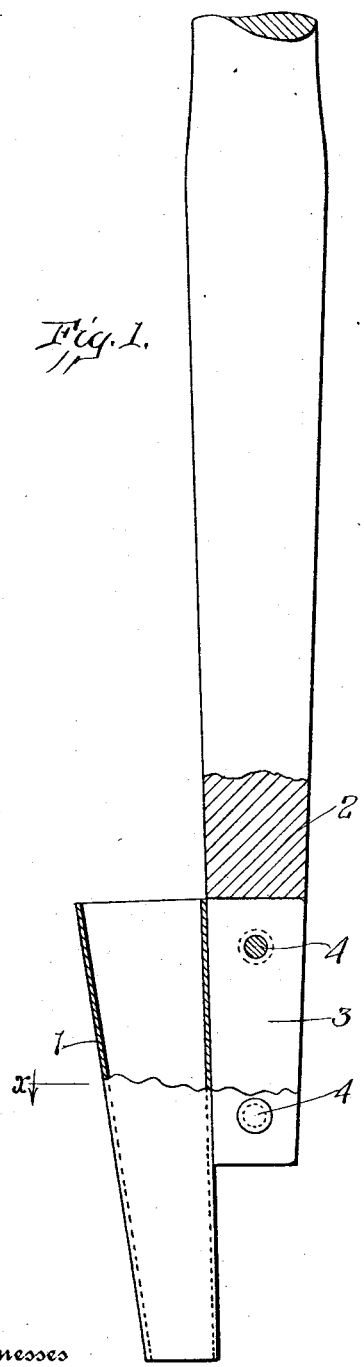
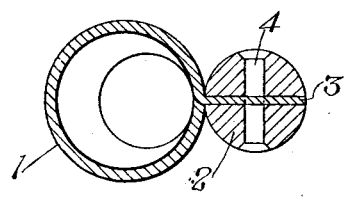
Witnesses
G. Howard Walmsley
Harriet L. Hammaker
Inventor
Garrett A. Billow,
By Toulmin & Reed.
Attorney

UNITED STATES PATENT OFFICE.

GARRETT A. BILLOW, OF DAYTON, OHIO.

WEEDER.

1,053,148.  Specification of Letters Patent.  Patented Feb. 18, 1913.

Application filed May 25, 1912. Serial No. 699,619.

*To all whom it may concern:*

Be it known that I, GARRETT A. BILLOW, a citizen of the United States, residing at Dayton, in the county of Montgomery and State of Ohio, have invented certain new and useful Improvements in Weeders, of which the following is a specification, reference being had therein to the accompanying drawing.

This invention relates to weeders and more particularly to a device for removing weeds from lawns and other places where it is desirable to leave the sod or earth undisturbed.

The object of the invention is to provide a weeder which may be operated quickly and easily to remove the weeds without marring the lawn or leaving holes therein other than those left by the removal of the weeds themselves, which holes will be very small and will not disfigure the lawn.

It is a further object of the invention to provide such a device which can be manufactured in a simple, durable form at a low cost.

In the accompanying drawings, Figure 1 is an elevation of a weeder embodying my invention, partially in section; and Fig. 2 is a transverse sectional view, taken on the line *x x* of Fig. 1.

In these drawings I have illustrated one embodiment of the invention and have shown the same as comprising a tube 1, open at both ends and carried by a suitable manipulating device, such as a handle 2. The tube may be of any suitable shape, and, in the form here shown, is substantially circular in cross section and has its walls converging from top to bottom. The tube is preferably formed of sheet metal which is bent into the desired shape and provided with a laterally extending lip 3 which may be extended into a kerf in the lower end of the handle and secured therein by means of rivets 4, thus forming a strong, rigid connection between the tube and the handle. In the construction here shown the handle also forms a stop to limit the downward movement of the tube and for this purpose the lower end of the handle terminates some distance above the lower end of the tube. When the device is formed of sheet metal the lower edge will ordinarily be of such a thickness that it will readily enter the ground without sharpening, but obviously it may be provided with a knife edge if desired.

In manipulating the device the lower end of the tube is placed over the center of the weed which is to be removed and a quick downward thrust of the device will cause the foliage and laterally extending roots to be severed and the main root, which, in many species of weeds, is substantially a vertical root, to be severed or broken when the upper portion of the same is forced into the tube. The entrance of successive roots into the lower end of the tube will force the preceding roots out of the upper end of the tube without attention on the part of the manipulator. Inasmuch as the tube is of small diameter it will be apparent at once that the lawn will not be cut up or disfigured and the only mark left will be the small hole from which the root has been removed. Further, it will be apparent that the construction of the device is at once simple and durable and is such that the device can be produced at a low cost. While I have shown and described one embodiment of my invention it will be understood that this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. In a weeder, the combination, with a handle having a kerf formed at its lower end, of an open-ended tube formed from sheet metal and having a radially extending lip disposed within the kerf of the handle, and means securing the lip and handle together.

2. As an article of manufacture, an open-ended tube for weeders formed from a blank of sheet metal and formed with a radially extending attaching lip.

In testimony whereof, I affix my signature in presence of two witnesses.

GARRETT A. BILLOW.

Witnesses:
JOSEPH J. MURPHY,
EDW. J. FITZSIMMONS.

Copies of this patent may be obtained for five cents each, by addressing the "Commissioner of Patents, Washington, D. C."